June 25, 1929. D. MATTEI ET AL Re. 17,335

APPARATUS FOR THE MANUFACTURE OF TUBES OF CEMENT ASBESTOS OR SIMILAR SUBSTANCES

Original Filed Feb. 18, 1921 4 Sheets-Sheet 1

INVENTORS

Hugo Mattei + Adolfo Mazza

BY

Knight Bros

ATTORNEYS

INVENTORS
Diego Mattei + Adolfo Magga
BY
Knight Bros
ATTORNEYS

June 25, 1929. D. MATTEI ET AL Re. 17,335

APPARATUS FOR THE MANUFACTURE OF TUBES OF CEMENT ASBESTOS OR SIMILAR SUBSTANCES

Original Filed Feb. 18, 1921 4 Sheets-Sheet 3

INVENTORS

Diego Mattei + Adolfo Mazza

BY

Knight Bros

ATTORNEYS

INVENTORS
Hugo Mattei + Adolfo Mazza
BY
Knight Bros
ATTORNEYS

Reissued June 25, 1929. Re. 17,335

UNITED STATES PATENT OFFICE.

DIEGO MATTEI AND ADOLFO MAZZA, OF GENOA, ITALY, ASSIGNORS TO "ETERNIT" PIETRA ARTIFICIALE, SOCIETA ANONIMA, OF GENOA, ITALY, AN ITALIAN COMPANY.

APPARATUS FOR THE MANUFACTURE OF TUBES OF CEMENT ASBESTOS OR SIMILAR SUBSTANCES.

Original No. 1,627,104, dated May 3, 1927, Serial No. 446,046, filed February 18, 1921, and in Italy March 2, 1920. Application for reissue filed April 22, 1929. Serial No. 357,256.

The manufacturing of cement-asbestos tubes (Eternit tubes) or of tubes of similar substances for high pressure piping with the so-called "revolving" machines employed in the manufacture of cardboards, though on first sight it may appear a simple matter because "Eternit" slabs in fact are but tubes cut along one of their generating lines and then developed on a flat surface while they are still in soft conditions, yet in practice involves numerous difficulties of various kinds on account of the various requirements which the tubes must fulfil.

These requirements may be summarized as follows:

1st. The tubes should be perfectly circular in cross section and their inside diameter should be uniform.

2nd. They should exhibit a uniform thickness and a high strength in order to be capable to withstand the high pressures to which they will be subjected.

3rd. They should be 3 to 4 metres long, that is to say much in excess of the ordinary width (1,20 metres) of the machines for the manufacture of "Eternit" or cement and asbestos slabs.

4th. They must be evenly compressed over their whole length in order that they may be possessed of equal strength throughout.

With "Eternit" machines (suitably widened to give the required tube length) in which the pressure on the tube making cylinder is applied at the end of the cylinder axis, even if this pressure, by means of sleeves, be transmitted to the inside of the cylinder at the points that are most convenient towards the reduction of sagging, yet it is absolutely impossible to obtain pipes of small or medium size and considerable thickness complying with the above said requirements for two reasons: firstly because, due to the rolling action on the material, the material detaches itself from the main cylinder or mandrel especially in the center portion, thus increasing in diameter before it has reached the required thickness, and in the second place because the pressure, especially with smaller pipes, cannot be evenly distributed over the whole length on account of the sagging that occurs in the main cylinder or mandrel due to forces arising in vertical direction owing to the manner in which pressure is applied and in horizontal direction from the tangential action of the travelling band.

The rolling action is due not only to the pressure exerted on the material along the generating contact line between the main cylinder or mandrel and the band-carrying cylinder, but also to the tangential action exerted on the material in order to make the main cylinder revolve and to overcome the passive resistances.

The passive resistances mainly consist in the friction set up in the main cylinder bearings and due to the vertical pressure to which the bearings are subjected and to the horizontal pressure exerted by the travelling band. The stresses to which the pipe material is subjected due to these resistances will obviously increase with decreasing pipe diameter, and with small pipes will be still greater because sagging cylinders must be rotated.

In order to remove or lessen the said inconveniences it will be necessary:

1st. To arrange that the material be tenacious as much as possible consistently with the other requirements of the working process, and consequently that it be compressed and liberated from the excess water before it reaches the main cylinder.

2nd. To arrange that the pressure, instead of being concentrated on a single generating line, be distributed as evenly as ever possible over the whole of the pipe surface and be gradually decreasing according as the pipe thickness grows, so that each layer, when being formed be subjected to a greater pressure than when the successive layers are applied; the layer will thus no longer tend to increase in length.

3rd. To arrange that the tangential forces to which the pipe walls are subjected be as small as possible, to eliminate or minimize the bearing friction and to increase the pipe surface portion over which the force required to rotate the main cylinder and the pipe is applied.

A greater compactness of the material can be obtained by the use of one or several pairs of pressure rollers arranged between the ordinary water suction and the main cylinder. The top roller in the said pairs should be more or less loaded by means of weighted levers according as may be required. It must be protected against the material sticking to its surface by means of an endless felt belt provided with suitable guiding, washing, squeezing, etc., gears.

In order to realize a uniform pressure distribution over the whole pipe surface, the best method would be to build the pipe under the action of some flexible body such as felt, for instance, enveloping as much as possible of the pipe surface and simultaneously subjected to tension; or, next to the said method, to subject the pipe to the action of a set of rollers that are positively driven but not loaded at their ends, these rollers being distributed over the pipe's periphery and weighting thereon with all their weight and being capable of being shifted along straight or curved guides according as the pipe increases in thickness, or by suitably combining a driven flexible organ and a set of rollers as above indicated, in which case the flexible organ, beside preventing the material from sticking to the rollers, fulfils the duty of preventing the pipe from detaching itself from the main cylinder between two successive rollers.

In ordinary cases, that is to say for the most current pipe diameters, a single couple of heavy rollers will suffice, the two rollers being symmetrically arranged with respect to the vertical line perpendicular to the generating contact line between the pipe and the felt band supporting roller and being driven by an endless felt band which embraces a larger or smaller portion of the pipe periphery, the embraced portion being greater according as the pipe diameter and thickness are greater; such an arrangement will suffice to obtain the desired pipe thickness.

In order to effect the required pressure variations, the two pressure rollers should bear upon the pipe as already stated and in addition to this their journals should rest on two conveniently shaped surfaces and be capable of freely sliding along the same while the pipe is being built and increases in thickness.

The pressure exerted by each roller upon the pipe in each successive position will be obtained by splitting their weight into two components, viz, one normal to the resting surface and the other, which is the useful component, normal to the pipe, that is to say along the centre line of the pressure roller and of the pipe. The total pressure exerted on the generating contact line between the pipe and the lower felt band supporting roller will be the resultant of the two part pressures.

If the shifting of the pressure rollers is effected on plane surfaces so that the center line always maintains the same inclination, the pressure on the pipe will remain constant.

In order to vary the pressure the direction of the perpendicular to the resting surface must be varied and in such a case, if the said perpendicular is horizontal, the pressure on the generating contact line with the felt band supporting roller will have a maximum value, and will be equal to the weight of the pressure rollers; if the perpendicular is vertical, the value of the exerted pressure will be nought.

Surfaces can obviously always be found that fulfil the conditions with which it may be judged convenient to let the pressure vary while the pipe thickness grows and thus to prevent the pipe to detach itself from the main cylinder before it has reached the desired thickness.

The felt band interposed between the pressure rollers and the pipe and embracing a portion of the pipe periphery as said above further prevents the pipe material from adhering to the rollers and must accordingly be, not only driven, but also guided, washed and squeezed.

The described arrangement also exhibits the advantage that it does away with or appreciably reduces the passive resistances already spoken of. The pressure on the main cylinders being no longer applied to their journals, the friction resistances in the bearings due to vertical actions no longer subsist. The tangential action of the main felt band being neutralized or lessened by that of the felt band driving the pressure rollers and running in opposite direction, also the resistances due to tangential forces will be nearly altogether eliminated. The bearings which in ordinary machines hold the main cylinders in place can therefore be dispensed with and replaced by mere guides serving to ensure the vertical raising of the main cylinder while the pipe is being formed.

One embodiment of the invention is illustrated in the annexed drawings by way of example.

Fig. 1 diagrammatically shows the whole machine in side view.

Figure 9:
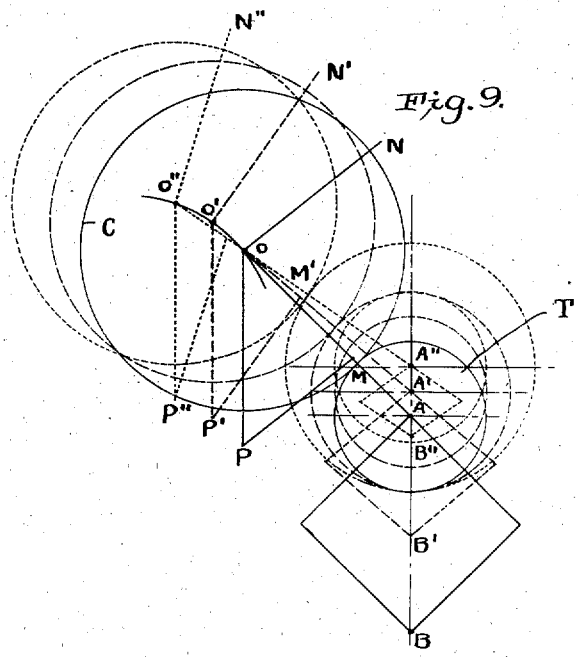
Figure 9A:
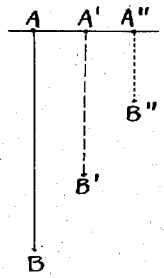

Figures 9 and 9ª are diagrams showing how the pressure distributes itself over the pipe according to the various thicknesses which the pipe is successively acquiring.

The machine comprises firstly a certain number of parts which it has in common with the ordinary cardboard and "Eternit" machines viz: vats 1 containing the mixture, rollers 2 covered with wire net, which take the mixture from the vats 1 and load it onto a travelling endless felt band 3; the pressure rollers 4 assisting in the delivery of the mixture from the rollers 2 onto the felt band; band guiding rollers 5, take-up rollers 6, adjustable rollers 7 for holding the band in the center, exhauster 8 taking out the moisture from the mixture carried on the band, band striker 9, perforated tubes 10 washing the band, squeezing rollers 11 for squeezing the water out of the band after washing, main band-supporting roller 12 (base roll) on which rests the main pipe forming cylinder or mandrel 20.

The following parts complete the machine:

A couple of squeezing rollers 13 13, for further drying the mixture so as to give it a suitable consistency to which object the upper roller may be weighted down on the lower roller by means of weighted levers so as to exert greater or smaller pressure according as may be required: a travelling endless band 14 winding itself round the upper roller 13′ in order to prevent the mixture sticking to this roller; a guiding roller 15 and a take-up roller 16 for the band 14, an adjustable roller 16′ for holding the band 14 in the middle, the washing tubes 17 and the driven squeezing rollers 18, and the vat 19 receiving the wash water.

20 is the main cylinder or mandrel on which the pipe is formed, and 21 21 the pipe compressing rollers (press rolls) carried by journals 21′ 21′.

22 22 are the slotted guides in which the journals 21′ 21′ are carried and can freely move. 23 (Fig. 3) are the pivots of the guides 22 and are inserted in the supports 24; by means of a handwheel and of the right and left hand threaded screw 25 the two supports 24 may be moved further apart or nearer to each other, whereby also the pressure rollers, 21 21 are brought farther apart or nearer to each other; 26 is a T-shaped piece carrying the screw 25, and 27 is a vertical guide inside which the main cylinder 20 or its journals may be moved up and down while the pipe is building. 28 are guides secured to the uprights of the machine framework; the T-shaped piece can move vertically along these guides. 29 is a rod on which the T-shaped piece 26 is suspended, the rod 29 being actuated by a piston 30 working in a cylinder 31.

By means of a pressure liquid fed into the cylinder 31 the whole movable equipment comprising: piston, piston rod 29, T-shaped piece 26, slotted guides 22 and pressure rollers 21 can be raised or lowered to the object of enabling the main cylinder 20 to be used to manufacture pipes of any diameter and of extracting the pipes after completion.

32 is a travelling endless band passing between the pressure rollers 21 21 and the pipe and encircling a portion of their periphery. 33 are guiding rollers for the said band; 34 are washing tubes; 35 are the driving and at the same time the squeezing rollers for the said band. 36 are adjustable rollers for keeping the band 32 in the middle, 37 is a heavy take-up roller for the said band and is freely carried on levers 38 or it may be arranged to move in vertical slots; this roller keeps the band duly taut when the movable equipment is raised, as shown by the dotted line 32′, and permits the pressure rollers 21 21 to be raised during the manufacture of the pipes. 39 is a stop against which the T-shaped piece bears during the building of the pipe.

Figure 1:
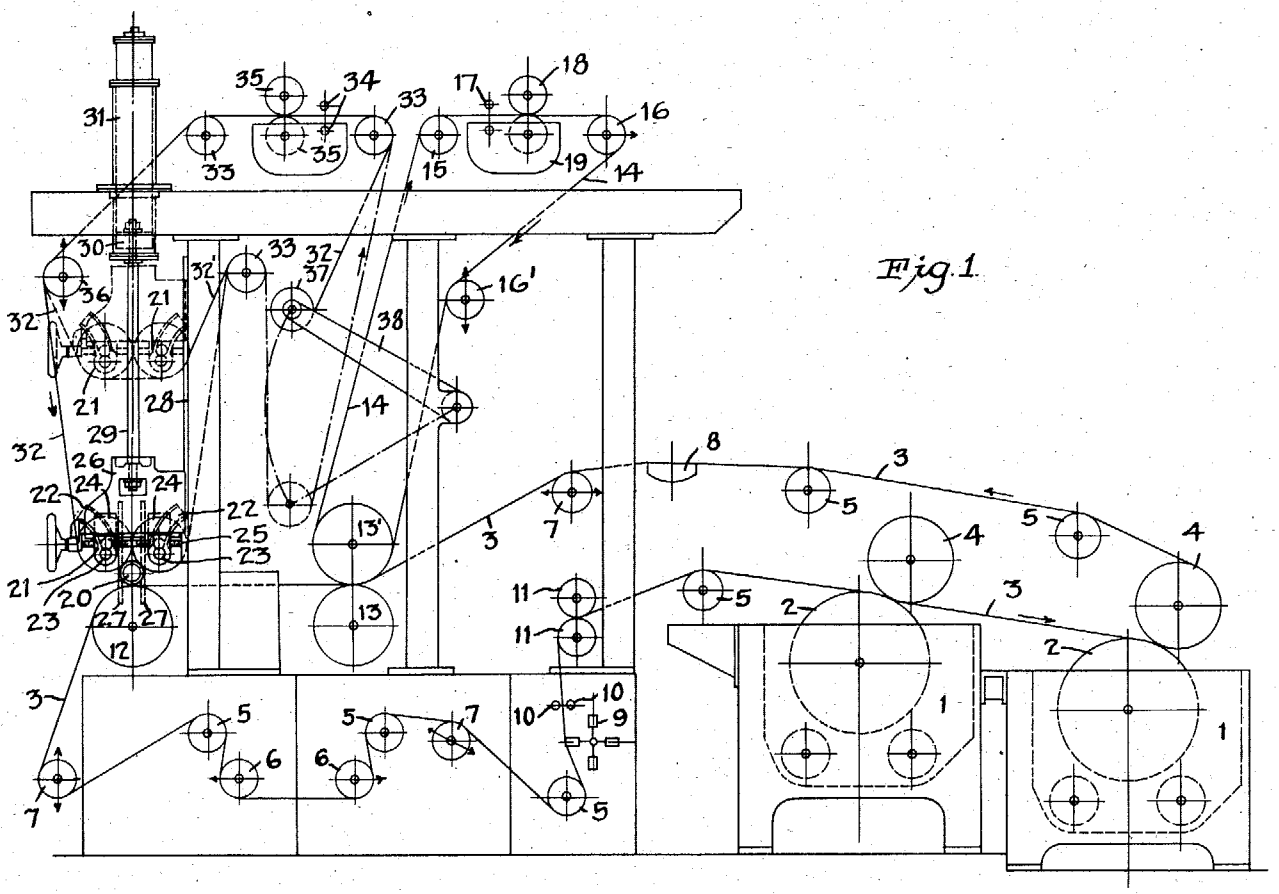
Figure 2:
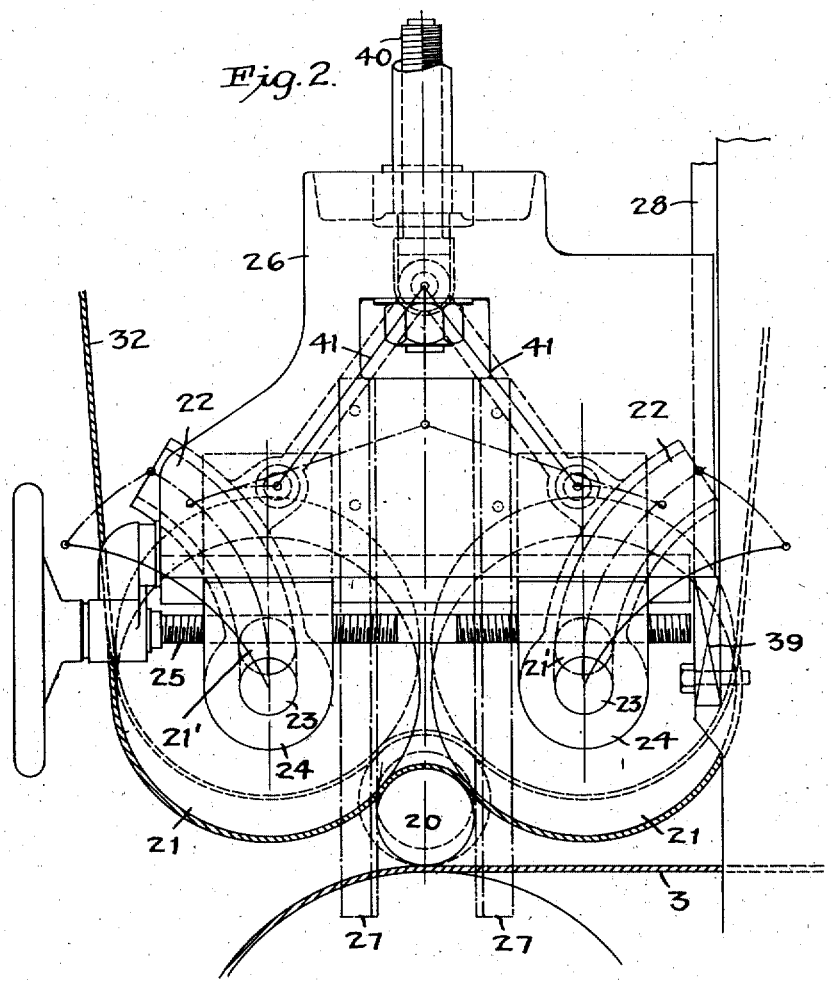
Fig. 2 shows in side view and to a larger scale the detail of the pressure rollers and how they are mounted.
Figure 3:
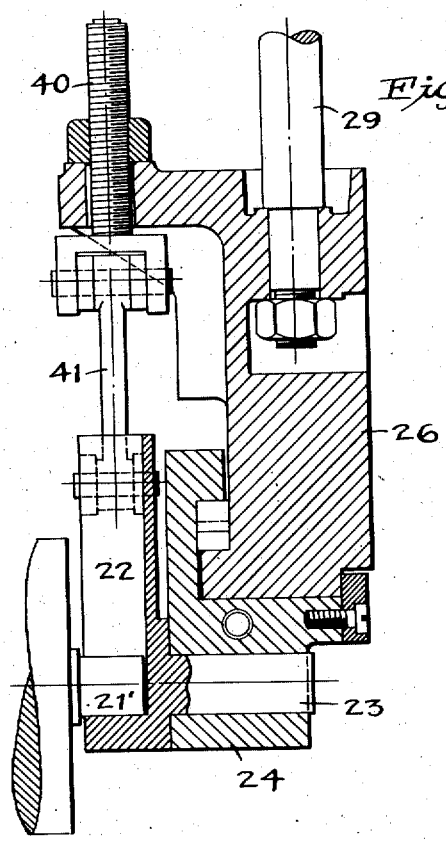
Fig. 3 is a section through A—B—C—D in Fig. 1 and shows how the pressure rollers are supported.

The guides 22 can be differently inclined by operating the screw 40 which actuates the links 41 attached to lugs projecting from the said guides (Figures 2 and 3). In this way the distribution of the pressure exerted on the pipe by the rollers 21 can be varied.

Figure 4:
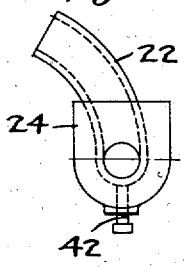
Figures 4 and 5 are a view and a section respectively of a curved guide for the pressure roller journals.
Figure 5:
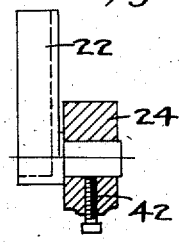
Figure 6:
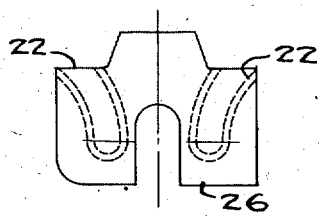
Fig. 6 is a view of a double curved guide.
Figure 7:
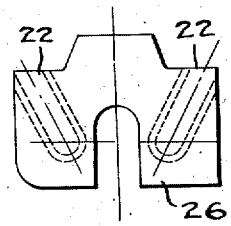
Fig. 7 is a view of a double straight guide.

The guides 22 may also be locked in any desired inclination by means of the set-screw 42 (Figures 4 and 5) fitted to the blocks 24 and working upon the pivots 23. The guiding slots may be curved (Figures 4, 5 and 6) or straight (Fig. 7) and may be formed in the T-shaped piece 26 itself instead of in a separate piece secured thereto.

Figure 8:
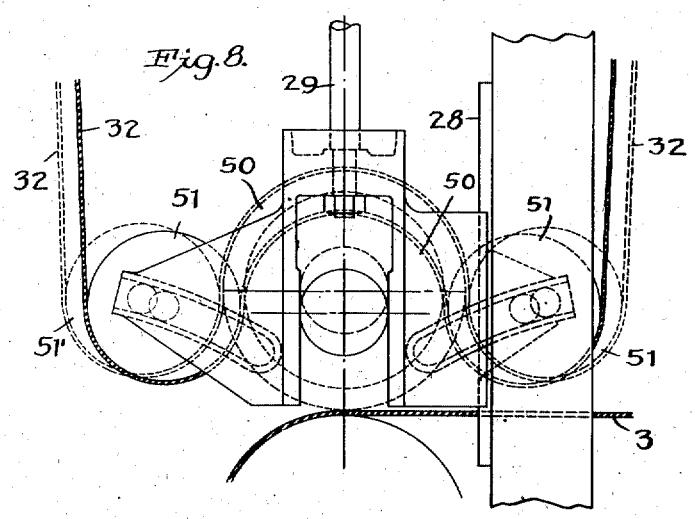
Fig. 8 shows a modified arrangement of the guides, main cylinder and pressure rollers specially adapted for pipes possessing a large diameter and a large thickness.

According to the arrangement illustrated in Fig. 8 (which enables the band to embrace a larger portion of the pipe periphery than the previous arrangement, as may be desirable when larger and thicker tubes are to be manufactured) 50 is the main cylinder, 51 the pressure cylinders in their initial position viz. when they rest directly on 50, whereas 50′ and 51′ respectively show the pipe when it has already attained a certain thickness and the pressure cylinders in their new corresponding position. 32 is the travelling endless felt band embracing a portion of the pressure rollers and a considerable portion of the pipe.

From the Figures 9 and 9ª it readily appears that the pressure exerted by the pressure rollers is gradually reduced according as the pipe increases in thickness.

Let OP—O′P′—O″P″ be the weight of the pressure cylinder ON—O′N′—O″N″ are the perpendiculars dropped on the supporting surface in the successive positions O—O′—O″; OM—O′M′—O″M″ are the weight components along the lines connecting the center of the main cylinder; and of the pressure cylinder, that is to say the pressures exerted by the pressure cylinder on the pipe in the positions O—O′—O″; AB—A′B′—A″B″ will be the pressures along the generating contact lines with the main felt band corresponding to the three positions O—O′—O″ of the pressure cylinders.

The working of the machine is as follows:

After raising the movable equipment the main cylinder 20 is made to rest on the main band-supporting roller 12. The movable equipment is then lowered until the pressure rollers 21 rest on the main cylinder in the proper position. The movable equipment is then locked against the stop 39.

The machine is now set running and the pressure rollers rise along their respective guides according as the pipe thickness increases. When the pipe is completed, the movable equipment is raised in order to allow of the pipe being extracted.

Having described our invention, what we claim, and desire to secure by Letters Patent is:

1. In a machine for making cement fibre tubular bodies, the combination of a rotary cylindrical mandrel, a plurality of forming rolls encompassing and pressing upon said mandrel, means for supplying a web of cement and fibre mixture to the mandrel, and means for gradually reducing the pressure of the forming rolls upon the mandrel as the size of the tubular body builds up on the mandrel.

2. In a machine for making cement fibre tubular bodies, the combination of a rotary cylindrical mandrel, a plurality of forming rolls between which the mandrel is located in operation, said forming rolls comprising a base roll and a press roll, and means for gradually reducing the pressure of the press roll upon the mandrel as the size of the tubular body builds up on the mandrel.

3. In a machine for making cement fibre tubular bodies, the combination of a rotary cylindrical mandrel, a plurality of forming rolls between which the mandrel is located in operation, said forming rolls comprising a base roll and two spaced press rolls, and means for gradually reducing the pressure of the press rolls upon the mandrel as the size of the tubular body builds up on the mandrel.

4. In a machine for making cement fibre tubular bodies, the combination of a rotary cylindrical mandrel, a plurality of forming rolls encompassing and pressing upon said mandrel, means for supplying a web of cement and fibre mixture to the mandrel, and guiding means for one of said forming rolls to permit its displacement under the action of building up a tubular body upon the mandrel, and for gradually reducing the pressure of the displaced forming roll upon the mandrel as the thickness of the tubular body is increased.

5. In a machine for making cement fibre tubular bodies, the combination of a rotary cylindrical mandrel, a plurality of forming rolls between which the mandrel is located in operation, said forming rolls comprising a base roll and a press roll, and guiding means for said press rolls to permit its displacement and gradually reduce the pressure of the press roll upon the mandrel as the size of the tubular body builds up on the mandrel.

6. In a machine for making cement fibre tubular bodies, the combination of a rotary cylindrical mandrel, a plurality of forming rolls between which the mandrel is encompassed in operation, said forming rolls comprising a base roll and two spaced press rolls, and guiding means for said press rolls to permit their displacement and gradually reduce their pressure upon the mandrel as the size of the tubular body builds up on the mandrel.

7. In a machine for making cement fibre tubular bodies, the combination of a rotary cylindrical mandrel, a plurality of forming rolls encompassing and pressing upon said mandrel, means for supplying a web of cement and fibre mixture to the mandrel, a flexible band or apron partially encircling said mandrel and means for gradually reducing the pressure of the forming rolls upon the mandrel as the size of the tubular body builds up on the mandrel.

8. In a machine for making cement fibre tubular bodies, the combination of a rotary cylindrical mandrel, a plurality of forming rolls between which the mandrel is located in operation, said forming rolls comprising a base roll and two spaced press rolls, a flexible band or apron running between the mandrel and the press rolls and partially encircling the mandrel, and means for gradually reducing the pressure of the press rolls upon the mandrel as the size of the tubular body builds up on the mandrel.

9. In a machine for making cement fibre tubular bodies, the combination of a rotary cylindrical mandrel, a plurality of forming rolls between which the mandrel is located in operation, said forming rolls comprising a base roll and a press roll, guides for said press roll to permit its displacement and gradually reduce its pressure upon the tubular body as it builds up on the mandrel, and means for adjusting said press roll guides to form tubular bodies of different diameters.

10. In a machine for making cement fibre tubular bodies, the combination of a rotary cylindrical mandrel, a plurality of forming rolls between which the mandrel is located in operation, said forming rolls comprising a base roll and two spaced press rolls, movably mounted guide members for said press rolls to permit their displacement and effect a gradual reduction of the pressure of the press rolls upon the mandrel as the size of the tubular body builds up on the mandrel, and adjustable means controlling the position of said guide members.

11. In a machine for the manufacture of pipes of the character described, means for forming a pulp layer comprising a pair of squeezing rollers, an endless band for protecting from the pulp the upper roller of said pair, a main pipe forming cylinder for receiving the layer of pulp, after the latter has passed between said squeezing rollers, a flexible band partially encircling the periphery of the pipe forming cylinder for compressing the pulp thereon, a set of heavy driven rollers distributed along the periphery of the pipe forming cylinder to compress the pulp during the manufacture of the pipe, and means for guiding the latter rollers to permit their displacement and for gradually decreasing their pressure on the pipe forming cylinder as the thickness of the pipe is increased.

12. A machine according to claim 11, having the flexible band adapted to drive the said heavy rollers, whilst preventing the pipe from detaching itself from the main cylinder between the rollers, and preventing the pulp from sticking to the rollers.

13. A machine according to claim 11, having carrying means for the said heavy driven rollers and their guiding means, fluid pressure mechanism for moving the said carrying means into and out of the operative position during the manufacture of the tube, and a take-up roller device for tightening the flexible band as the carrying means is moved.

14. A machine according to claim 11, having means for adjusting said roller guiding and pressure-reducing means to form pipes of different diameters.

DIEGO MATTEI.
ADOLFO MAZZA.